UNITED STATES PATENT OFFICE.

WALLACE DAWSON, OF MONTREAL, QUEBEC, CANADA.

VERMIFUGE.

SPECIFICATION forming part of Letters Patent No. 409,175, dated August 20, 1889.

Application filed May 13, 1889. Serial No. 310,635. (No specimens.)

*To all whom it may concern:*

Be it known that I, WALLACE DAWSON, of the city of Montreal, in the district of Montreal and Province of Quebec, Canada, have invented a certain new and useful Improved Medicinal Compound; and I do hereby declare that the following is a full, clear, and exact description of the same.

This invention relates to that class of remedial compounds which are put up in the form of lozenges, tablets, or drops; and it consists of an improved drop the characteristics of which are attractiveness and palatability, as well as efficiency in the operation of removing worms from the human system.

The essential ingredients in this remedy are the confection known as "chocolate cream," a drug for killing the worms, and a purgative for removing them and cleansing the bowels. The drugs with which I prefer to medicate the chocolate cream are santonin and elaterium, as these possess to the highest extent the necessary qualifications; but I may use their chemical equivalents.

Each tablet, lozenge, or drop should be compounded according to the following formula, viz: santonin, one grain; elaterium, one-fortieth of a grain; cream, fifteen grains; chocolate covering, nine grains. Total, twenty-five and one-fortieth grains.

In manufacturing a quantity of the drops, the following will show the proportions per pound avoirdupois: santonin, two hundred and eighty grains; elaterium, seven grains; cream, four thousand one hundred and ninety-three grains; chocolate, two thousand five hundred and twenty grains. Total, seven thousand grains.

The santonin and elaterium are powdered and thoroughly mixed together, and then incorporated with the cream, which latter is known to confectioners as sugar boiled with water to a certain consistency and then "whipped." This operation of "whipping" is particularly valuable in making my worm remedy, as the drugs are thereby evenly and thoroughly mixed with the cream, and the latter is otherwise peculiarly adapted for assimilation with the medicine. The mass is then divided and molded or pressed in the usual way into lozenges, tablets, or drops of convenient size, and these when sufficiently dry are dipped into liquefied chocolate, which is allowed to dry and thus form the chocolate covering, as is usual in making non-medicated chocolate-cream drops.

What I claim, and desire to secure by Letters Patent, is as follows:

The herein-described worm remedy, consisting of a drop of chocolate cream having santonin and elaterium incorporated therein, substantially in the proportions specified.

Montreal, April 16, 1889.

WALLACE DAWSON.

Witnesses:
R. A. KELLOND,
R. McDOUGALL.